US010116759B2

(12) United States Patent
Fan et al.

(10) Patent No.: US 10,116,759 B2
(45) Date of Patent: Oct. 30, 2018

(54) METHOD, APPARATUS AND COMPUTER FOR IDENTIFYING STATE OF USER OF SOCIAL NETWORK

(71) Applicant: Huawei Technologies Co., Ltd., Shenzhen (CN)

(72) Inventors: Wei Fan, Shenzhen (CN); Jianfeng Qian, Shenzhen (CN); Yadong Mu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 332 days.

(21) Appl. No.: 14/948,993

(22) Filed: Nov. 23, 2015

(65) Prior Publication Data

US 2016/0088105 A1 Mar. 24, 2016

Related U.S. Application Data

(63) Continuation of application No. PCT/CN2014/075497, filed on Apr. 16, 2014.

(30) Foreign Application Priority Data

Oct. 25, 2013 (CN) .......................... 2013 1 0513974

(51) Int. Cl.
*H04L 29/08* (2006.01)
*G06Q 50/00* (2012.01)
*H04L 12/58* (2006.01)

(52) U.S. Cl.
CPC .............. *H04L 67/24* (2013.01); *G06Q 50/01* (2013.01); *H04L 51/32* (2013.01); *H04L 67/22* (2013.01)

(58) Field of Classification Search
CPC ......... H04L 67/24; H04L 51/32; H04L 67/22; G06Q 50/01
See application file for complete search history.

(56) References Cited

U.S. PATENT DOCUMENTS 8,712,944 B1* 4/2014 Kim .......................... G06N 7/00
706/45
2012/0258691 A1* 10/2012 Baer .................. H04M 1/72563
455/412.2
(Continued)

FOREIGN PATENT DOCUMENTS

CN 102394798 A 3/2012
CN 102929928 A 2/2013

OTHER PUBLICATIONS

Xiong, Fei, et al. "An information diffusion model based on retweeting mechanism for online social media." Physics Letters A 376.30 (2012): 2103-2108.*
(Continued)

*Primary Examiner* — Chris Parry
*Assistant Examiner* — Caroline H Jahnige
(74) *Attorney, Agent, or Firm* — Conley Rose, P.C.

(57) ABSTRACT

A method and an apparatus for identifying a state of a user of a social network. The identification method includes acquiring a user-event similarity of a user regarding a new event; identifying whether the user is a silent user or a non-activated user according to the user-event similarity; and determining whether the silent user or the non-activated user on the social network is finally in an activated state or a non-activated state. In the foregoing manner, a novel user state model of a social network is designed in the present disclosure, the model includes an activated state, a non-activated state and an unstable silent state, and a final state of a user is inferred precisely under full and comprehensive consideration of factors that may affect the state of the user, such that the state of the user can be accurately and precisely monitored.

16 Claims, 5 Drawing Sheets

(56) References Cited

U.S. PATENT DOCUMENTS

2013/0159220 A1    6/2013  Winn et al.
2014/0258188 A1*   9/2014  Chen .................... G06N 99/005
                                                    706/12

OTHER PUBLICATIONS

Saito, Kazumi, et al. "Selecting information diffusion models over social networks for behavioral analysis." Joint European Conference on Machine Learning and Knowledge Discovery in Databases. Springer, Berlin, Heidelberg, 2010.*
Machines Translation and Abstract of Chinese Publication No. CN102929928, Feb. 13, 2013, 14 pages.
Foreign Communication From a Counterpart Application, Chinese Application No. 201310513974.5, Chinese Office Action dated Jun. 7, 2017, 6 pages.
Xie, J., et al., "Prediction of User's Retweet Behavior in Social Network," Journal of Shanghai Jiao Tong University, vol. 47, No. 4, Apr. 2013, 5 pages.
Foreign Communication From a Counterpart Application, PCT Application No. PCT/CN2014/075497, International Search Report dated Jul. 16, 2014, 7 pages.
Foreign Communication From a Counterpart Application, PCT Application No. PCT/CN2014/075497, Written Opinion dated Jul. 16, 2014, 3 pages.

* cited by examiner

METHOD, APPARATUS AND COMPUTER FOR IDENTIFYING STATE OF USER OF SOCIAL NETWORK

CROSS-REFERENCE TO RELATED APPLICATIONS

This application is a continuation of International Application No. PCT/CN2014/075497, filed on Apr. 16, 2014, which claims priority to Chinese Patent Application No. 201310513974.5, filed on Oct. 25, 2013, both of which are hereby incorporated by reference in their entireties.

TECHNICAL FIELD

The present disclosure relates to the field of social networks, and in particular, to a method, an apparatus and a computer for identifying a state of a user of a social network.

BACKGROUND

Two essential factors of a social network are users and events. The users can follow each other to share information. When a new event occurs on the social network, a user may respond in a manner of sharing the event with friends or submitting a comment, so as to spread information, and finally achieve a stable state, that is, a final state of the user regarding an event may be an activated state (sharing or commenting on the event), or a non-activated state.

At the beginning after generation of a new event, only some users respond, and states of most users are unknown. How to predict a final state of a user as early as possible is a technology that has important practical value. In a conventional technology, generally, it is assumed that a state of a user is quickly converged to one of the following two states: an activated state or a non-activated state. In the prior art, it has been considered that sometimes a time used by a user to respond to an event is excessively long, and an asynchronous time delay independent cascade model (AsIC model) and an asynchronous time delay linear threshold model (AsLT model) are mainly used for analysis.

For a conventional AsIC model, nodes on a social network only have an activated state and a non-activated state, and the nodes can only change from a non-activated state to an activated state. Assuming that at a time t, a neighboring node w of a node v becomes an activated node, a probability that the neighboring node w enables the node v in a non-activated state to change to an activated state is $p_{v,w}$. If there are multiple activated neighboring nodes around the node v, an order in which the neighboring nodes affect the node v is arbitrary, but an affecting degree is related to a value of $p_{v,w}$, and a larger value of $p_{v,w}$ indicates that the node v is more likely to be activated. After being activated, the node v also affects neighboring nodes of the node v. Such a process is repeated until there is no node that can be activated. For the AsLT model, nodes on a social network have only an activated state and a non-activated state, and the nodes can only change from a non-activated state to an activated state. Each node v has a threshold $\theta_v$, where $\theta_v \in [0,1]$, which represents a difficulty level at which the node v is affected, and a smaller threshold indicates that the node v is more likely to be activated. A set of neighboring nodes that affect the node v is N(v), and for any $w \in N(v)$, $b_{v,w}$ represents a degree at which a node w affects the node v, and satisfies $s(v) = \Sigma_w b_{v,w} \leq 1$. If $s(v) \geq \theta_v$, the node v changes to an activated state; and w refers to a node in an activated state in N(v). After being activated, the node v also affects neighboring nodes of the node v. Such a process is repeated until there is no node that can be activated.

In the prior art, a relationship of mutual attraction between a user and an event is not fully considered. That is, for an event that a user is interested in, the user generally responds quickly; for an event that the user is not interested in at all, eventually, the user usually does not make any response; and for an event between the two types, the user usually enters a swinging or silent state. Besides, some phenomena of social psychology on a social network are not considered, either. For example, if a total quantity of associated users in an activated state increases, a probability that the user changes to an activated state generally also increases accordingly. Therefore, in the prior art, at the beginning after generation of a new event, it cannot be fully considered that users may be in a state between an activated state and a non-activated state, and final states of a large quantity of users cannot be inferred precisely under full and comprehensive consideration of factors that may affect the states of the users, so that the states of the users cannot be accurately and precisely monitored.

SUMMARY

Embodiments of the present disclosure provide a method, an apparatus and a computer for identifying a state of a user of a social network, where a novel user state model of a social network is designed, the model includes an activated state, a non-activated state and an unstable silent state, and a final state of a user is inferred precisely under full and comprehensive consideration of factors that may affect the state of the user, such that the state of the user can be accurately and precisely monitored.

A first aspect provides a method for identifying a state of a user of a social network, where the social network includes an activated user, a non-activated user, and a silent user, a state of the silent user is unstable, the silent user finally becomes an activated user or a non-activated user, and the identification method includes acquiring a user-event similarity of a user regarding a new event; identifying whether the user is a silent user or a non-activated user according to the user-event similarity; and determining whether the silent user or the non-activated user on the social network is finally in an activated state or a non-activated state.

In a first possible implementation manner of the first aspect, the identifying whether the user is a silent user or a non-activated user according to the user-event similarity includes comparing the user-event similarity with a decision point value of the user, where if the user-event similarity is greater than the decision point value, the user is a silent user; otherwise, the user is a non-activated user, where the decision point value is a value existing for the user and used for determining a state of the user, and a lower decision point value indicates that the user is more likely to be a silent user.

In a second possible implementation manner of the first aspect, the acquiring a user-event similarity includes acquiring an event-event similarity and a user-user similarity on the social network; obtaining a record of a similar event by the user according to the event-event similarity, where the similar event refers to an event that has happened before and that is similar to the new event; and performing iteration according to the record and the user-user similarity to obtain the user-event similarity of the user regarding the event.

In a third possible implementation manner of the first aspect, the determining whether the silent user or the non-activated user is finally in an activated state or a non-activated state includes determining a state of an associated user of the silent user or the non-activated user in a previous iteration, where the associated user refers to a user that has a follow relationship with the user; and determining, according to the state of the associated user in the previous iteration, a probability that the silent user or the non-activated user changes to an activated state.

In a fourth possible implementation manner of the first aspect, the determining whether the silent user or the non-activated user is finally in an activated state or a non-activated state further includes, for the silent user, determining a total quantity of associated users of the silent user that are currently in an activated state; and determining whether the silent user is finally in an activated state or a non-activated state according to the total quantity and a threshold of the silent user, where the threshold is a real number existing for the silent user and ranging between 0 and 1, and the threshold is related to a difficulty level at which the user is activated.

In a fifth possible implementation manner of the first aspect, the determining whether the silent user is finally in an activated state or a non-activated state according to the total quantity and a threshold includes comparing the total quantity with the threshold, where if the total quantity is greater than or equal to the threshold, the silent user is finally in an activated state; or if the total quantity is less than the threshold, the silent user is finally in a non-activated state.

A second aspect provides an apparatus for identifying a state of a user of a social network, where the social network includes an activated user, a non-activated user, and a silent user, a state of the silent user is unstable, the silent user finally becomes an activated user or a non-activated user, and the identification apparatus includes a similarity acquiring module configured to acquire a user-event similarity of a user regarding a new event; a user identification module configured to identify whether the user is a silent user or a non-activated user according to the user-event similarity; and a state determining module configured to determine whether the silent user or the non-activated user on the social network is finally in an activated state or a non-activated state.

In a first possible implementation manner of the second aspect, the user identification module is configured to compare the user-event similarity with a decision point value of the user, where if the user-event similarity is greater than the decision point value, the user is a silent user; otherwise, the user is a non-activated user, where the decision point value is a value existing for the user and used for determining a state of the user, and a lower decision point value indicates that the user is more likely to be a silent user.

In a second possible implementation manner of the second aspect, the similarity acquiring module is configured to acquire an event-event similarity and a user-user similarity on the social network; obtain a record of a similar event by the user according to the event-event similarity, where the similar event refers to an event that has happened before and that is similar to the new event; and perform iteration according to the record and the user-user similarity to obtain the user-event similarity of the user regarding the event.

In a third possible implementation manner of the second aspect, the state determining module is configured to determine a state of an associated user of the silent user or the non-activated user in a previous iteration, where the associated user refers to a user that has a follow relationship with the user; and determine, according to the state of the associated user in the previous iteration, a probability that the silent user or the non-activated user changes to an activated state.

In a fourth possible implementation manner of the second aspect, for the silent user, the state determining module is further configured to determine a total quantity of associated users of the silent user that are currently in an activated state; and determine whether the silent user is finally in an activated state or a non-activated state according to the total quantity and a threshold of the silent user, where the threshold is a real number existing for the silent user and ranging between 0 and 1, and the threshold is related to a difficulty level at which the user is activated.

In a fifth possible implementation manner of the second aspect, the state determining module is further configured to compare the total quantity with the threshold, where if the total quantity is greater than or equal to the threshold, the silent user is finally in an activated state; or if the total quantity is less than the threshold, the silent user is finally in a non-activated state.

A third aspect provides a computer for identifying a state of a user of a social network, where the social network includes an activated user, a non-activated user, and a silent user, a state of the silent user is unstable, the silent user finally becomes an activated user or a non-activated user, and the computer includes a processor, a memory and a bus, where the memory and the processor are connected to the bus separately, to perform data exchange and communication through the bus; the processor is configured to acquire a user-event similarity of a user regarding a new event, and identify whether the user is a silent user or a non-activated user according to the user-event similarity; the memory is configured to store states of users; and the processor is further configured to determine whether the silent user or the non-activated user on the social network is finally in an activated state or a non-activated state.

In a first possible implementation manner of the third aspect, the processor is configured to compare the user-event similarity with a decision point value of the user, where if the user-event similarity is greater than the decision point value, the user is a silent user; otherwise, the user is a non-activated user, where the decision point value is a value existing for the user and used for determining a state of the user, and a lower decision point value indicates that the user is more likely to be a silent user.

In a second possible implementation manner of the third aspect, the processor is configured to acquire an event-event similarity and a user-user similarity on the social network; obtain a record of a similar event by the user according to the event-event similarity, where the similar event refers to an event that has happened before and that is similar to the new event; and perform iteration according to the record and the user-user similarity to obtain the user-event similarity of the user regarding the event.

In a third possible implementation manner of the third aspect, the processor is further configured to determine a state of an associated user of the silent user or the non-activated user in a previous iteration, where the associated user refers to a user that has a follow relationship with the user; and determine, according to the state of the associated user in the previous iteration, a probability that the silent user or the non-activated user changes to an activated state.

In a fourth possible implementation manner of the third aspect, the processor is further configured to determine a total quantity of associated users of the silent user that are currently in an activated state; and determine whether the silent user is finally in an activated state or a non-activated state according to the total quantity and a threshold of the silent user, where the threshold is a real number existing for the silent user and ranging between 0 and 1, and the threshold is related to a difficulty level at which the user is activated.

In a fifth possible implementation manner of the third aspect, the processor is further configured to compare the total quantity with the threshold, where if the total quantity is greater than or equal to the threshold, the silent user is finally in an activated state; or if the total quantity is less than the threshold, the silent user is finally in a non-activated state.

The embodiments of the present disclosure provide a method and an apparatus for identifying a state of a user of a social network. A novel user state model of a social network is designed, and the model includes an activated state, a non-activated state and an unstable silent state; at the beginning after generation of an event, it is fully considered that a user may be in a state between an activated state and a non-activated state, that is, a silent state, and factors that may affect the state of the user are fully and comprehensively considered; whether the user is initially a silent user or a non-activated user is identified according to a user-event similarity, such that an initial state of the user is inferred, and then it is determined whether the silent user or the non-activated user is finally in an activated state or a non-activated state in different information spreading manners according to a difference between user states; and therefore, a final state of the user is precisely inferred, and the state of the user is accurately and precisely monitored.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

The present disclosure is described in detail below with reference to the accompanying drawings and implementation manners.

Figure 1:
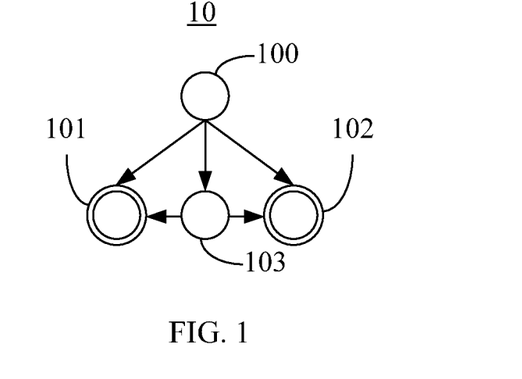
FIG. 1 is a schematic diagram of a user state model of a social network according to a first embodiment of the present disclosure.

Referring to FIG. 1 first, FIG. 1 is a schematic diagram of a user state model of a social network according to a first embodiment of the present disclosure. As shown in FIG. 1, the user state model 10 of the social network of the present disclosure is as follows. On the social network, when a new event is triggered, a user 100 may be an activated user 101, or a non-activated user 102, or a silent user 103. The activated user 101 is known, and the other users are unknown. The silent user 103 is just in an unstable intermediate state, and may finally become the activated user 101 or the non-activated user 102 after a period of time.

When a user is in an activated state, it is indicated that the user may respond in a manner of sharing the event with friends or submitting a comment. When a user is in a non-activated state, it is indicated that the user does not share the event with friends or comment on the event. When a user is in a silent state, it is indicated that the user needs more time than the activated user 101 and the non-activated user 102 to decide whether to share or comment on the event or not. For an event that the user is interested in, the user generally responds quickly; for an event that the user is not interested in at all, eventually, the user usually does not make any response. Therefore, if the user is very interested in a similar event, it is indicated that the user is also interested in the new event, and the user is likely to change to an activated state. Besides, if the user has many associated users that are interested in the new event, that is, in an activated state, the user is enabled to also become interested in the new event, that is, be likely to change to an activated state. The similar event refers to an event that has happened before and that is similar to the new event. The associated users refer to users that have a follow relationship with the user. Therefore, whether another user is initially the non-activated user 102 or the silent user 103 is related to a record of a similar event of the event by the user and a state of an associated user of the user regarding the event, that is, determining needs to be performed according to a user-event similarity.

In this embodiment of the present disclosure, the record of the similar event of the event by the user is described using an event-event similarity, and the state of the associated user of the user regarding the event is described using a user-user similarity. Therefore, the event-event similarity and the user-user similarity that are on the social network are acquired first. The record of the similar event by the user may be obtained according to the event-event similarity. The user-event similarity may be obtained by performing iteration according to the record of the similar event by the user and the user-user similarity, so as to estimate a probability that the user is in a silent state. In other embodiments of the present disclosure, the user-event similarity may also be calculated using another method, for example, only the event-event similarity or the user-user similarity is considered. The user-event similarity is compared with a decision point value of the user, where if the user-event similarity is greater than the decision point value, the user is the silent user 103; or if the user-event similarity is less than or equal to the decision point value, the user is the non-activated user 102. The decision point value is a value existing for the user and used for determining a state of the user, and a lower decision point value indicates that the user is more likely to be the silent user.

After initial states of all users on the social network are determined, final states of all the users on the social network are finally obtained in different information spreading manners according to states of the users. For the silent user 103 and the non-activated user 102, an AsIC model is used as an information spreading manner, that is, a state of an associated user of the silent user 103 or the non-activated user 102 in a previous iteration is determined first, and a probability that the silent user 103 or the non-activated user 102 changes to an activated state is determined according to the state of the associated user in the previous iteration. The foregoing process is repeated to determine whether all silent users 103 and non-activated users 102 are finally in an activated state or a non-activated state. For the silent user 103, an AsLT model is further used as an information spreading manner, that is, a total quantity of associated users of the silent user 103 that are currently in an activated state is determined first, and whether the silent user 103 is finally in an activated state or a non-activated state is determined according to the total quantity of associated users that are currently in an activated state and a threshold of the silent user. The foregoing process is repeated to determine whether all silent users 103 are finally in an activated state or a non-activated state. The threshold is a real number existing for the silent user and ranging between 0 and 1, and the threshold is related to a difficulty level at which the user is activated. For different silent users, thresholds of the silent users may be different. In conclusion of the foregoing two cases, all the users on the social network are finally in an activated state or a non-activated state.

In this embodiment of the present disclosure, a novel user state model of a social network is designed, and the model includes an activated state, a non-activated state and an unstable silent state; at the beginning after generation of a new event, it is fully considered that a user may be in a state between an activated state and a non-activated state, that is, a silent state, and factors that may affect the state of the user are fully and comprehensively considered to distinguish whether the user is initially in a silent or non-activated state; and therefore, an initial state of the user is precisely inferred, then a final state of the user is determined in different information spreading manners according to states of the user, and the state of the user is accurately and precisely monitored.

Figure 2:
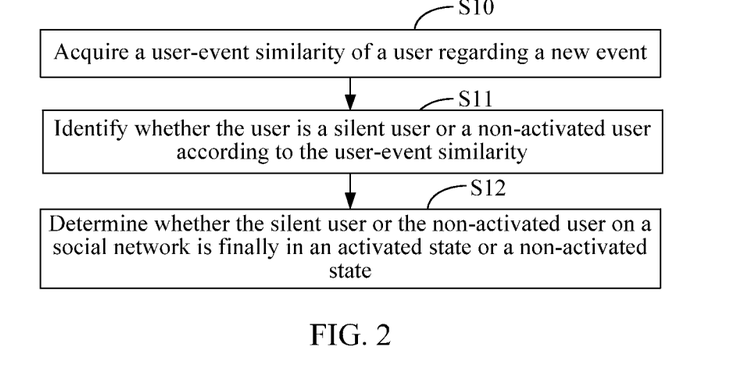
FIG. 2 is a schematic flowchart of a method for identifying a state of a user of a social network according to a first embodiment of the present disclosure.

Referring to FIG. 2, FIG. 2 is a schematic flowchart of a method for identifying a state of a user of a social network according to a first embodiment of the present disclosure. As shown in FIG. 2, the method for identifying a state of a user of a social network includes the following steps.

S10: Acquire a user-event similarity of a user regarding a new event.

The user-event similarity describes a degree of interest of the user in the new event, and is used for estimating a probability that the user is in a silent state. A larger user-event similarity indicates that the user is more interested in the new event. The user-event similarity is related to a record of a similar event of the event by the user and a state of an associated user of the user regarding the event.

S11: Identify whether the user is a silent user or a non-activated user according to the user-event similarity.

When a new event is triggered, there are always some users entering an activated state first, that is, becoming activated users. The activated users are known, and the other users are unknown, and may be non-activated users or silent users. Whether the user is a non-activated user or a silent user needs to be determined according to a value of the user-event similarity.

S12: Determine whether the silent user or the non-activated user on the social network is finally in an activated state or a non-activated state.

After initial states of all users are determined on the social network, a diffusion with silence model (DS model) is used for information spreading, so as to determine whether all silent users and non-activated users finally change to an activated state or a non-activated state after a period of time. An AsIC model is used to perform information spreading for the silent user and the non-activated user, and an AsLT model is further used to perform information spreading for the silent user, so as to determine whether the user finally changes to an activated state or a non-activated state.

In this embodiment of the present disclosure, a novel user state model of a social network is designed, and the model includes an activated state, a non-activated state and an unstable silent state; at the beginning after generation of a new event, it is fully considered that a user may be in a state between an activated state and a non-activated state, that is, a silent state, and a factor that may affect the state of the user, that is, a user-event similarity, is fully and comprehensively considered to distinguish whether the user is initially in a silent or non-activated state; and therefore, an initial state of the user is inferred, so as to precisely infer a final state of the user, and monitor the state of the user accurately and precisely.

Figure 3:
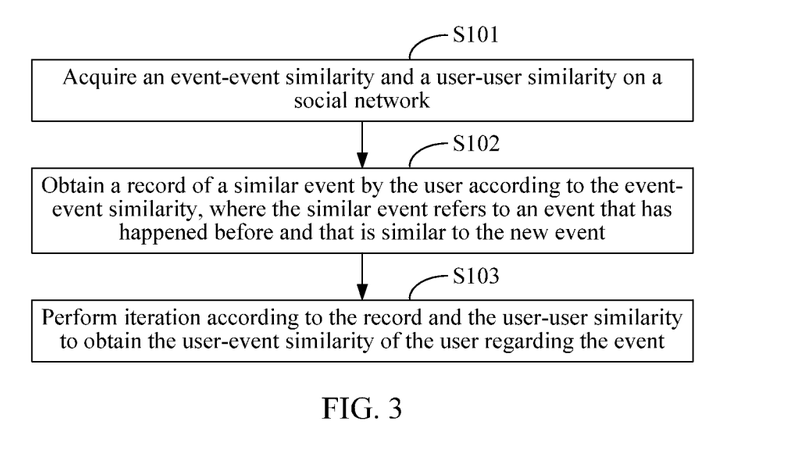
FIG. 3 is a schematic flowchart of a method for identifying a state of a user of a social network according to a second embodiment of the present disclosure.

Referring to FIG. 3, FIG. 3 is a schematic flowchart of a method for identifying a state of a user of a social network according to a second embodiment of the present disclosure. Descriptions are made on the basis of the first embodiment of the present disclosure, and the social network is represented by a graph G=<V,E>. V and E are sets of vertexes/edges of the graph. Each vertex corresponds to a particular user or event separately, and each edge represents an operation such as following between users and sharing of an event by a user. Determining of a user-event similarity in this embodiment of the present disclosure is described on the basis of the graph. As shown in FIG. 3, a method for acquiring a user-event similarity of a user regarding a new event includes the following steps.

S101: Acquire an event-event similarity and a user-user similarity on the social network.

The event-event similarity refers to that if event factors corresponding to two events are similar, the two events are similar. An event-event similarity of events that belong to a same type is greater than an event-event similarity of evens that belong to different types. In this embodiment of the present disclosure, the event-event similarity describes a similarity degree between a similar event and the new event. A larger event-event similarity indicates that the two events are more similar, and the user is more likely to make a same response to the two events, that is, sharing or commenting on both of the two events, or sharing or commenting on neither of the two events. On one social network, users in a same social circle are more likely to know each other, or are more willing to establish a friend relationship. If a user has a friend relationship with many friends of another user, the two users are very likely to have a friend relationship. The user-user similarity may be used to describe a probability that users become friends on the social network. In this embodiment of the present disclosure, the user-user similarity describes a degree at which a state of an associated user regarding the new event affects the user-event similarity. A larger user-user similarity indicates that the users are more likely to make a same response to the new event, that is, both sharing or commenting on the event, or neither sharing or commenting on the event. The associated user refers to a user that has a follow relationship with the user, that is, may be a friend of the user.

The event-event similarity and the user-user similarity may be obtained using the following formula:

$$s_t(x, y) = \frac{\sum_{i \in N(x), j \in N(y)} S_{t-1}(i, j)}{|N(x)||N(y)|}$$

where i, j, x, y each represent an event or a user, N(x) and N(y) represent a neighborhood of x and a neighborhood of y respectively, t represents a quantity of iterations, $s_t(x, y)$ represents an event-event similarity or a user-user similarity at a $t^{th}$ iteration, and an initial state of $s_t(x, y)$ is:

$$s_0(x, y) = \begin{cases} 1 & \text{if } x = y \\ 0 & \text{otherwise} \end{cases}$$

that is, if x and y are a same user or a same event, the user-user similarity and the event-event similarity are 1, and if x and y are not a same user or a same event, the user-user similarity and the event-event similarity are 0.

S102: Obtain a record of a similar event by the user according to the event-event similarity, where the similar event refers to an event that has happened before and that is similar to the new event.

In S102, the record of the similar event by the user describes an impact of the record of the similar event by the user on the user-event similarity, and may be represented as an initial value of the user-event similarity of the user regarding the new event. If the user is likely to share or comment on an event that has happened before and is of a same type as the new event, that is, in an activated state, the user is likely to be interested in the new event, that is, has a big chance to change to an activated state. The record of the similar event by the user may be obtained using the following formula:

$$i_0(u, v) = \frac{\sum_{v_i \in N(u)} s(v, v_i)}{|N(u)|}$$

where $s(v, v_i)$ represents an event-event similarity between an event v and an event $v_i$, N(u) represents a neighborhood of a user u, and $i_0(u, v)$ represents an initial value of a user-event similarity of the user u regarding the event v. In other embodiments of the present disclosure, the user-user similarity and the event-event similarity may also be calculated using another method, which is not further described herein.

S103: Perform iteration according to the record and the user-user similarity to obtain the user-event similarity of the user regarding the event.

Weighted averaging is performed on the record of the similar event by the user and the user-user similarity to obtain a user-event similarity of the user regarding the event at a $t^{th}$ iteration:

$$i_t(u, v) = \frac{\sum_{uu_i \in E_{uu}} i_{t-1}(u, u_i) s(u, u_i)}{\sum_{uu_i \in E_{uu}} s(u, u_i)}$$

and
user-event similarities of R iterations are superimposed to obtain the user-event similarity of the user regarding the event:

$$i(u, v) = \sum_{t=0 \ldots R} i_t(u, v)$$

where $E_{uu}$ represents a set of associated users, $i_t(u, v)$ represents a user-event similarity of the user u regarding the event v in a previous iteration, $s(u, u_i)$ represents the user-user similarity, R represents a quantity of iterations and is a value generated randomly, and i(u, v) represents the user-event similarity of the user u regarding the event v. In other embodiments of the present disclosure, the user-event similarity may also be calculated using another method, for example, only the event-event similarity or the user-user similarity is considered.

It can be seen that, in a calculation process of the user-event similarity, factors that may affect the state of the user are fully and comprehensively considered, where the factors include the record of the similar event by the user and the state of the associated user regarding the new event, so as to identify whether the user is initially a silent user or a non-activated user, such that a final state of the user can be precisely inferred, and the state of the user can be accurately and precisely monitored.

On the social network, when a new event is triggered, there are always some users entering an activated state first, that is, becoming activated users. The activated users are known, and the other users are unknown, and may be non-activated users or silent users. Whether the user is a non-activated user or a silent user can be determined according to a value of the obtained user-event similarity.

Figure 4:
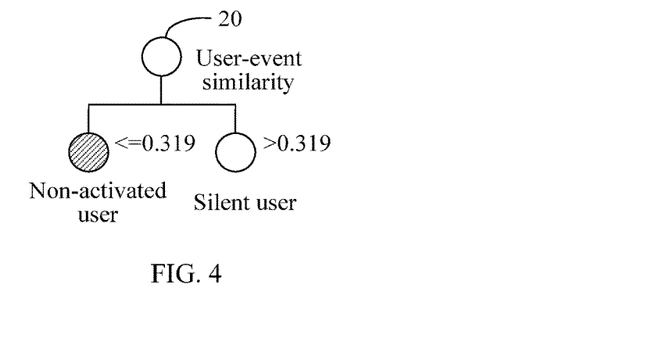
FIG. 4 is a schematic diagram of a method for identifying a state of a user of a social network according to a third embodiment of the present disclosure.

The user-event similarity is compared with a decision point value of the user, where if the user-event similarity is greater than the decision point value, the user is a silent user; or if the user-event similarity is less than or equal to the decision point value, the user is a non-activated user. As shown in FIG. 4, assuming that the decision point value is 0.319, when the calculated user-event similarity is less than or equal to 0.319, a user 20 is a non-activated user; or when the calculated user-event similarity is greater than 0.319, a user 20 is a silent user. The decision point value is a value existing for the user and used for determining a state of the user, and a lower decision point value indicates that the user is more likely to be a silent user. The decision point value may be randomly generated, and the value affects a final result.

It can be seen that, in the user state model of the social network in the present disclosure, at the beginning after generation of a new event, in addition to a conventional manner in which only an activated user and a non-activated user exist, it is fully considered that a user may be in a state between an activated state and a non-activated state, that is, a silent state, and factors that may affect the state of the user are fully and comprehensively considered; whether the user is initially a silent user or a non-activated user is identified according to a user-event similarity, such that an initial state of the user is inferred; and therefore, a final state of the user is precisely inferred subsequently, and the state of the user is accurately and precisely monitored.

After initial states of all users are determined on the social network, a DS model is used for information spreading, so as to determine whether all silent users and non-activated users finally change to an activated state or a non-activated state after a period of time.

Figure 5:
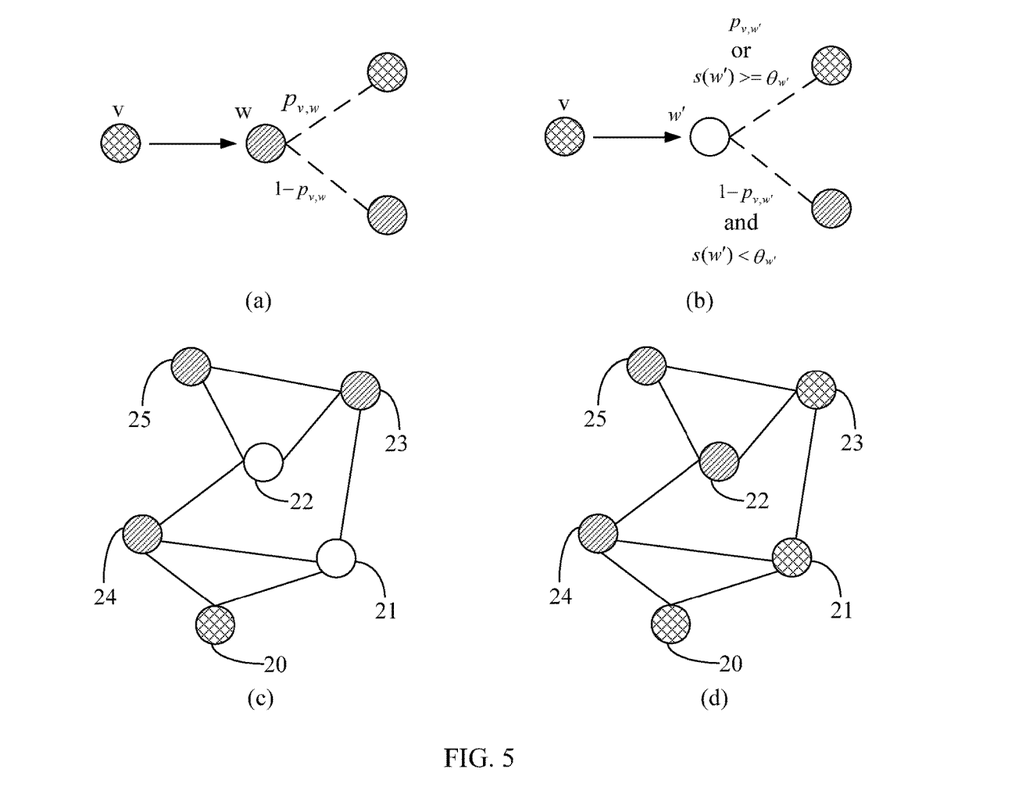
FIG. 5 is a schematic diagram of a method for identifying a state of a user of a social network according to a fourth embodiment of the present disclosure.

For the non-activated user and the silent user, an AsIC model is used for information spreading. First, a state of an associated user of the silent user or the non-activated user in a previous iteration is determined, and then a probability that the silent user or the non-activated user changes to an activated state is determined according to the state of the associated user in the previous iteration. That is, if the associated user of the user is activated, there is a probability that the associated user enables the user to be activated. As shown in FIG. 5, the non-activated user is used as an example in the (a) portion of the figure, a user w is a non-activated user, a user v changes to an activated state in a previous iteration, and the user v is an associated user of the user w, and then in a next iteration, a probability that the user w changes to an activated state is $p_{v,w}$. The foregoing process is repeated to determine whether all silent users and non-activated users are finally in an activated state or a non-activated state, until there is no node that can be activated on the social network when the AsIC model is used as an information spreading manner. In this way, a set S1 of activated users on the social network is obtained.

For the silent user, in addition to that the foregoing AsIC model is used for information spreading, an AsLT model is further used for information spreading. The AsLT model includes determining a total quantity of associated users of the silent user that are currently in an activated state and determining, according to the total quantity and a threshold of the silent user, whether the silent user is finally in an activated state or a non-activated state. The total quantity of associated users that are currently in an activated state is compared with the threshold, where if the total quantity is greater than or equal to the threshold, the silent user is finally in an activated state; or if the total quantity is less than the threshold, the silent user is finally in a non-activated state. The total quantity of associated users that are currently in an activated state describes an overall impact of associated users in an activated state on the silent user. The threshold is a real number existing for the silent user and ranging between 0 and 1, and the threshold is related to a difficulty level at which the user is activated. A smaller threshold indicates that the silent user is more likely to be activated. For different silent users, thresholds of the silent users may be different. As shown in the (b) portion of FIG. 5, a user w' is a silent user, and has a threshold $\theta_{w'}$, where $\theta_{w'} \in [0,1]$, which indicates a difficulty level at which a silent user w' is affected; a user v is in an activated state, and the user v is an associated user of the user w'. If an overall impact of the associated user v of the silent user w' on the user w' is s(w'), a value of s(w') is compared with a value of the threshold $\theta_{w'}$, where if $s(w') \geq \theta_{w'}$, the silent user w' changes to an activated state, or if $s(w') < \theta_{w'}$, the silent user w' changes to a non-activated state. The foregoing process is repeated to determine whether all silent users are finally in an activated state or a non-activated state, until there is no node that can be activated on the social network when the AsLT model is used as an information spreading manner. In this way, a set S2 of activated users on the social network is obtained.

In this embodiment of the present disclosure, the total quantity of associated users that are currently in an activated state may be represented using a relative proportion of associated users. For example, a silent user has totally 100 associated users, and 75 of the associated users are activated users; then a total quantity of associated users that are currently in an activated state may be represented by 75%, and on this basis, an affecting degree at which the associated users in an activated state enable the silent user to change to an activated state is estimated. In other embodiments of the present disclosure, the total quantity of associated users that are currently in an activated state may also be represented using an absolute quantity of associated users. For example, there are 50 activated users in associated users of a silent user; then a total quantity of associated users of the silent user that are currently in an activated state is 50, and on this basis, an affecting degree at which the associated users in an activated state enable the silent user to change to an activated state is estimated. A more stable final result is obtained when the total quantity of associated users that are currently in an activated state is represented using an absolute quantity.

It can be seen that whether the silent user and the non-activated user on the social network are finally in an activated state or a non-activated state is obtained using the foregoing AsIC model and AsLT model as information spreading manners. Assuming that a set of final activated users on the social network is S, S=S1∪S2. That is, the set S of final activated users on the social network is a union of the set S1 of activated users that is obtained using the AsIC model as an information spreading manner and the set S2 of activated users that is obtained using the AsLT model as an information spreading manner. As shown in the (c) and (d) portions of FIG. 5, (c) shows initial states of users on a social network, where a user 20 is an activated user, users 21 and 22 are silent users, and users 23, 24 and 25 are non-activated users. The silent user 21 finally becomes an activated user using the AsIC model and the AsLT model. After the user 21 becomes an activated user, the non-activated user 23 is enabled using the AsIC model to also become an activated user, while the other users finally become non-activated users because initial states of associated users of the other users are not sufficient to enable the other users to become activated users. In this way, final states of the users on the social network are obtained. As shown in the (d) portion of FIG. 5, the users 20, 21 and 23 are in an activated state, and the users 22, 24 and 25 are in a non-activated state. In other embodiments of the present disclosure, the AsLT model and/or the AsIC model may be used for the non-activated user or the silent user separately, so as to achieve a better effect of determining a final state of the user.

In this embodiment of the present disclosure, a precision and a recall rate may be used to estimate accuracy of a result of this embodiment of the present disclosure. The precision refers to a proportion of users that are actually in an activated state in users that are predicted, using the method in this embodiment of the present disclosure, to be finally in an activated state. The recall rate refers to a ratio of a quantity of users that are actually in an activated state in the users that are predicted, using the method in this embodiment of the present disclosure, to be finally in an activated state to a quantity of actual activated users on the social network. For example, it is assumed that after a period of time, there are finally 200 activated users on a social network, and it is predicted using the method in this embodiment of the present disclosure that there are finally 150 activated users. In the 150 activated users, 90 are actually activated users, and 60 are actually non-activated users; then the precision is 90/150, that is, 60%, and the recall rate is 90/200, that is, 45%.

The method in this embodiment of the present disclosure may be used for user behavior analysis. Referring to Table 1, Table 1 is related statistical data, captured from Twitter®, of a user state model. Two data sets are obtained, and include a quantity of users, a quantity of Tweets, a quantity of friend connections, a quantity of silent user-events, a quantity of activated user-events, and a quantity of non-activated user-events, as shown in Table 1.

|  | Data set 1 | Data set 2 |
|---|---|---|
| Quantity of users | 1113 | 748 |
| Quantity of Tweets | 17075 | 14432 |
| Friend connections | 10546 | 53639 |
| Quantity of silent user-events | 103357 | 905500 |
| Quantity of activated user-events | 863 | 10021 |
| Quantity of non-activated user-events | 226515 | 2689198 |

The quantity of Tweets refers to a quantity of similar events. The quantity of activated user-events does not include a quantity of silent user-events that finally become activated user-events. The quantity of non-activated user-events does not include a quantity of silent user-events that finally become non-activated user-events either. In the present disclosure, information spreading is performed on this basis, so as to obtain the final states of the users.

Figure 6:
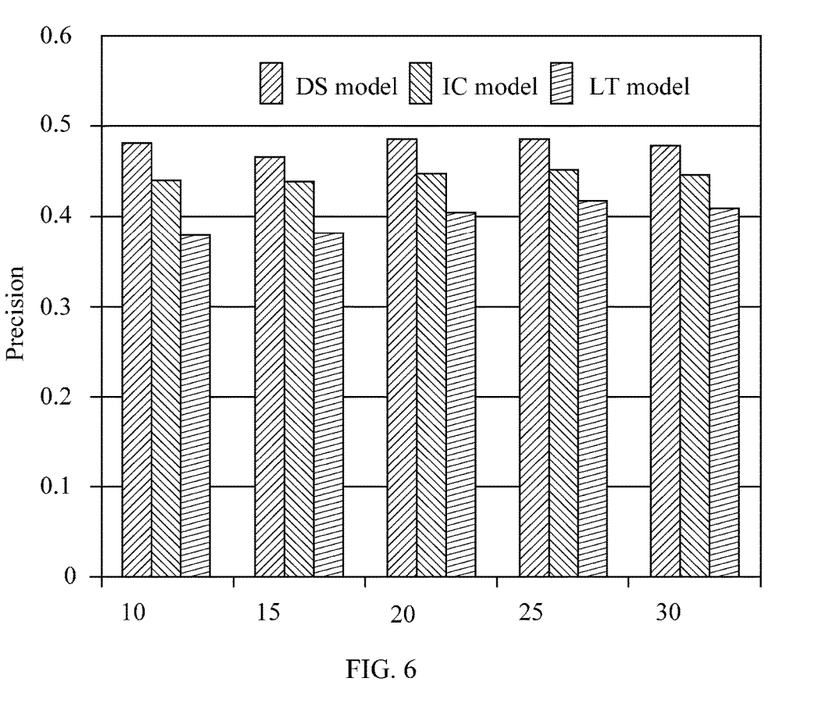
FIG. 6 is a schematic diagram of a precision of a method for identifying a state of a user of a social network according to the fourth embodiment of the present disclosure.
Figure 7:
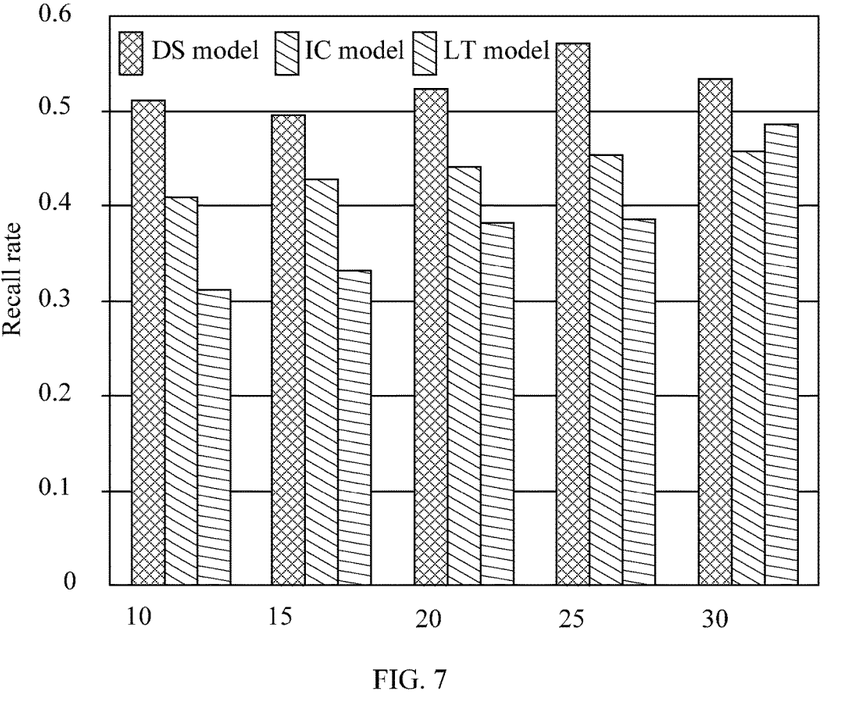
FIG. 7 is a schematic diagram of a recall rate of a method for identifying a state of a user of a social network according to the fourth embodiment of the present disclosure.

For data set 1, to initialize the user state model, 10, 15, 20, 25 and 30 users that first share the event are selected separately, that is, quantities of activated users are 10, 15, 20, 25 and 30 separately, and the other users are unknown. It is assumed that an iteration operation is performed 50 times. FIG. 6 and FIG. 7 show, in the foregoing 5 initial states with different quantities of activated users, precisions and recall rates of predictions of user states that are obtained separately using the DS model in the present disclosure, and the AsIC model and the AsLT model in the prior art for information spreading. A horizontal coordinate axis represents a quantity of initial activated users, and a vertical coordinate axis represents a precision or a recall rate. As shown in FIG. 6 and FIG. 7, the precision and recall rate obtained using the DS model for information spreading is much better than those obtained using the other two models.

In this embodiment of the present disclosure, for users that are initially in a non-activated state, an AsIC model is used for information spreading, and for users that are initially in a silent state, the AsIC model and an AsLT model are used for information spreading, so as to determine final states of users, that is, the final states of the users are determined in different information spreading manners according to initial states of the users, such that the states of the users are monitored precisely.

Figure 8:
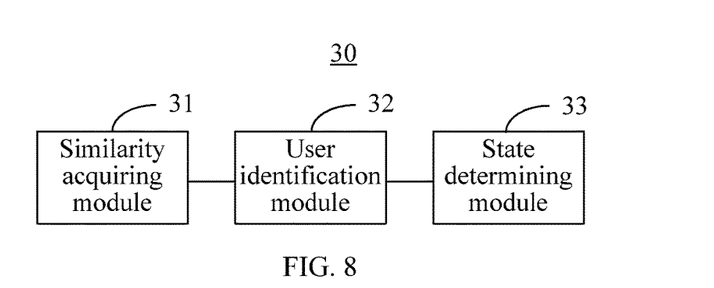
FIG. 8 is a schematic structural diagram of an apparatus for identifying a state of a user of a social network according to a first embodiment of the present disclosure.

Referring to FIG. 8, FIG. 8 is a schematic structural diagram of an apparatus for identifying a state of a user of a social network according to a first embodiment of the present disclosure. As shown in FIG. 8, the apparatus 30 for identifying a state of a user of a social network includes a similarity acquiring module 31, a user identification module 32 and a state determining module 33. The similarity acquiring module 31 is configured to acquire a user-event similarity of a user regarding a new event. The user identification module 32 is configured to identify whether the user is a silent user or a non-activated user according to the user-event similarity. The state determining module 33 is configured to determine whether the silent user or the non-activated user is finally in an activated state or a non-activated state.

In this embodiment of the present disclosure, when a new event is triggered, initial states on the social network include an activated user, a non-activated user and a silent user. The activated user is known, and the other users are unknown. Whether the user is initially in a non-activated state or a silent state needs to be determined according to the user-event similarity. The silent user is just in an intermediate state and is unstable, and finally becomes the activated user or the non-activated user after a period of time. The user-event similarity is used to estimate a probability that the user is in a silent state. A larger value of the user-event similarity indicates that the user is more likely to be a silent user. Whether the user is initially a non-activated user or a silent user is related to a record of a similar event by the user and a state of an associated user regarding the new event. Therefore, the similarity acquiring module 31 first acquires an event-event similarity and a user-user similarity on the social network, and obtains a record of a similar event by the user according to the event-event similarity, and then performs iteration according to the record and the user-user similarity to obtain the user-event similarity of the user regarding the event. The similar event refers to an event that has happened before and that is similar to the new event. The event-event similarity describes a similarity degree between the similar event and the new event. A larger event-event similarity indicates that the two events are more similar, and the user is more likely to make a same response to the two events, that is, sharing or commenting on both of the two events, or sharing or commenting on neither of the two events. The user-user similarity is used to describe a degree at which the state of the associated user regarding the new event may affect the user-event similarity. A larger user-user similarity indicates that users are more likely to make a same response to the new event, that is, both sharing or commenting on the event, or neither sharing or commenting on the event. The associated user refers to a user that has a follow relationship with the user, that is, may be a friend of the user.

After the similarity acquiring module 31 obtains the user-event similarity, the user identification module 32 compares the user-event similarity with a decision point value of the user. If the user-event similarity is greater than the decision point value, the user is a silent user. If the user-event similarity is less than or equal to the decision point value, the user is a non-activated user. The decision point value is a value existing for the user and used for determining a state of the user, and a lower decision point value indicates that the user is more likely to be a silent user. Therefore, in this embodiment of the present disclosure, a novel user state model of a social network is designed, and the model includes an activated state, a non-activated state and an unstable silent state; at the beginning after generation of an event, it is fully considered that a user may be in a state between an activated state and a non-activated state, that is, a silent state, and factors that may affect the state of the user are fully and comprehensively considered to distinguish whether the user is initially in a silent or non-activated state; and therefore, an initial state of the user is inferred, so as to precisely infer a final state of the user subsequently, and monitor the state of the user accurately and precisely.

After initial states of all users are determined on the social network, the state determining module 33 uses a DS model for information spreading, so as to determine whether all silent users and non-activated users finally change to an activated state or a non-activated state after a period of time.

The DS model is implemented on the basis of a conventional AsIC model and AsLT model.

In this embodiment of the present disclosure, for the silent user and the non-activated user, the state determining module 32 uses the AsIC model as an information spreading manner, that is, a state of an associated user of the silent user or the non-activated user in a previous iteration is determined first, and a probability that the silent user or the non-activated user changes to an activated state is determined according to the state of the associated user in the previous iteration. The state determining module 33 repeats the foregoing process to determine whether all the silent users and non-activated users are finally in an activated state or a non-activated state. For the silent user, the state determining module 33 further uses the AsLT model as an information spreading manner, that is, a total quantity of associated users of the silent user that are currently in an activated state is determined first, and whether the silent user is finally in an activated state or a non-activated state is determined according to the total quantity of associated users that are currently in an activated state and a threshold of the silent user. The state determining module 33 compares the total quantity of associated users that are currently in an activated state with the threshold, where if the total quantity is greater than or equal to the threshold, the silent user is finally in an activated state; or if the total quantity is less than the threshold, the silent user is finally in a non-activated state. The threshold is a real number existing for the silent user and ranging between 0 and 1, and the threshold is related to a difficulty level at which the user is activated. The state determining module 33 repeats the foregoing process to determine whether the silent users are finally in an activated state or a non-activated state. The total quantity of associated users that are currently in an activated state may be represented using a relative proportion of associated users, and may also be represented using an absolute quantity of associated users. Moreover, a more stable final result is obtained when the total quantity of associated users that are currently in an activated state is represented using an absolute quantity.

In this embodiment of the present disclosure, whether a silent user and a non-activated user on a social network is finally in an activated state or a non-activated state is a combination of the foregoing two cases, that is, a set of final activated users on the social network is a union of activated users generated in the two cases. In this way, it is finally determined that all users on the social network are in an activated state or a non-activated state. Therefore, in this embodiment, for the non-activated user, the AsIC model is used for information spreading, and for the silent user, the AsIC model and the AsLT model are used for information spreading, and a union of the two is obtained, such that the final state of the user is determined. That is, the final state of the user is determined in different information spreading manners according to states of the user; and therefore the state of the user is accurately and precisely monitored.

Figure 9:
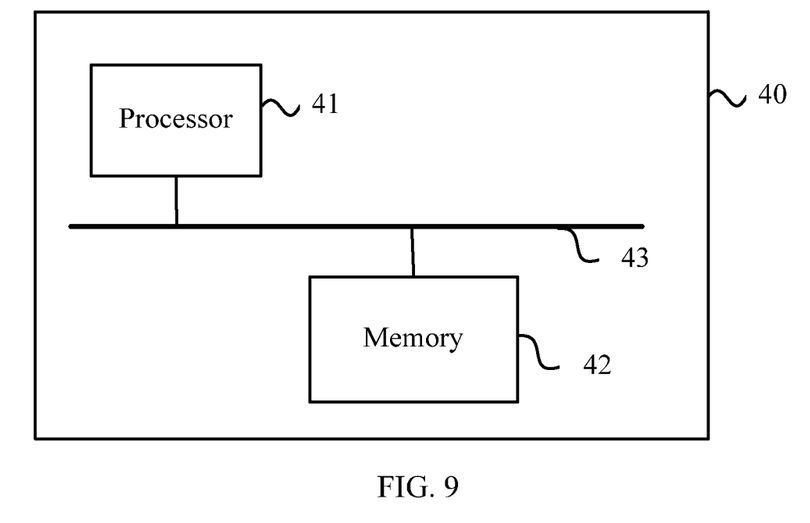
FIG. 9 is a schematic structural diagram of a computer for identifying a state of a user of a social network according to a second embodiment of the present disclosure.

Referring to FIG. 9, FIG. 9 is a schematic structural diagram of a computer for identifying a state of a user of a social network according to a second embodiment of the present disclosure. As shown in FIG. 9, the computer 40 includes a processor 41 and a memory 42, where the memory 42 and the processor 41 are connected to a bus 43 separately, to perform data exchange and communication through the bus 43.

In this embodiment of the present disclosure, when a new event is triggered, initial states on the social network include an activated user, a non-activated user and a silent user. The activated user is known, and the other users are unknown. Whether a user is initially in a non-activated state or a silent state needs to be determined according to a user-event similarity. The silent user is just in an intermediate state and is unstable, and finally becomes the activated user or the non-activated user after a period of time. The processor 41 is configured to acquire a user-event similarity of a user regarding a new event, and identify whether the user is a silent user or a non-activated user according to the user-event similarity. The memory 42 stores states of users. The processor 41 is further configured to determine whether the silent user or the non-activated user is finally in an activated state or a non-activated state.

In this embodiment of the present disclosure, the user-event similarity is related to a record of a similar event by the user and a state of an associated user regarding the new event. The processor 41 first acquires an event-event similarity and a user-user similarity on the social network, and obtains a record of a similar event by the user according to the event-event similarity, and then performs iteration according to the record and the user-user similarity to obtain the user-event similarity of the user regarding the event. The memory 42 stores the user-event similarity. The user-event similarity is used to estimate a probability that the user is in a silent state. A larger value of the user-event similarity indicates that the user is more likely to be a silent user. The similar event refers to an event that has happened before and that is similar to the new event. The event-event similarity describes a similarity degree between the similar event and the new event. A larger event-event similarity indicates that the two events are more similar, and the user is more likely to make a same response to the two events, that is, sharing or commenting on both of the two events, or sharing or commenting on neither of the two events. The user-user similarity is used to describe a degree at which the state of the associated user regarding the new event may affect the user-event similarity. A larger user-user similarity indicates that the users are more likely to make a same response to the new event, that is, both sharing or commenting on the event, or neither sharing or commenting on the event. The associated user refers to a user that has a follow relationship with the user.

After obtaining the user-event similarity, the processor 41 compares the user-event similarity with a decision point value of the user. If the user-event similarity is greater than the decision point value, the user is a silent user. If the user-event similarity is less than or equal to the decision point value, the user is a non-activated user. The decision point value is a value existing for the user and used for determining a state of the user, and a lower decision point value indicates that the user is more likely to be a silent user. In this way, a novel user state model of a social network is designed, and the model includes an activated state, a non-activated state and an unstable silent state; at the beginning after generation of an event, it is fully considered that a user may be in a state between an activated state and a non-activated state, that is, a silent state, and factors that may affect the state of the user are fully and comprehensively considered to distinguish whether the user is initially in a silent or non-activated state; and therefore, an initial state of the user is inferred, so as to precisely infer a final state of the user subsequently, and monitor the state of the user accurately and precisely.

After determining initial states of all users, the processor 41 uses a DS model for information spreading, so as to determine whether all silent users and non-activated users finally change to an activated state or a non-activated state after a period of time. The DS model is implemented on the basis of a conventional AsIC model and AsLT model. For the silent user and the non-activated user, the processor 41 uses the AsIC model as an information spreading manner to determine whether the silent user or the non-activated user is finally in an activated state or a non-activated state. That is, the processor 41 first determines a state of an associated user of the silent user or the non-activated user in a previous iteration, and then determines, according to the state of the associated user in the previous iteration, a probability that the silent user or the non-activated user changes to an activated state. The memory 42 stores the state of the user, such that the processor 41 determines a final state of the associated user of the user. The processor 41 repeats the foregoing process to determine whether all silent users and non-activated users are finally in an activated state or a non-activated state. For the silent user, the processor 41 further uses the AsLT model as an information spreading manner, so as to determine whether the silent user is finally in an activated state or a non-activated state. That is, the processor 41 first determines a total quantity of associated users of the silent user that are currently in an activated state; and determines whether the silent user is finally in an activated state or a non-activated state according to the total quantity of associated users that are currently in an activated state and a threshold of the silent user. The processor 41 compares the total quantity of associated users that are currently in an activated state with the threshold, where if the total quantity is greater than or equal to the threshold, the silent user is finally in an activated state; or if the total quantity is less than the threshold, the silent user is finally in a non-activated state. The threshold is a real number existing for the silent user and ranging between 0 and 1, and the threshold is related to a difficulty level at which the user is activated. The memory 42 stores the state of the user, such that the processor 41 determines a final state of the associated user of the user. The processor 41 repeats the foregoing process to determine whether all silent users and non-activated users are finally in an activated state or a non-activated state. In conclusion of the foregoing two cases, the processor 41 finally determines that all users on the social network are finally in an activated state or a non-activated state. In this way, the final state of the user is precisely inferred in different information spreading manners according to states of the user; and therefore the state of the user is accurately and precisely monitored.

In conclusion, in the present disclosure, a novel user state model of a social network is designed, and the model includes an activated state, a non-activated state and an unstable silent state; at the beginning after generation of an event, it is fully considered that a user may be in a state between an activated state and a non-activated state, that is, a silent state, and factors that may affect the state of the user are fully and comprehensively considered; whether the user is initially a silent user or a non-activated user is identified according to a user-event similarity, such that an initial state of the user is inferred, and then it is determined whether the silent user or the non-activated user is finally in an activated state or a non-activated state in different information spreading manners according to a difference between user states; and therefore, a final state of the user is precisely inferred, and the state of the user is accurately and precisely monitored.

The foregoing descriptions are merely embodiments of the present disclosure but are not intended to limit the patent scope of the present disclosure. Any equivalent modifications made to the structures or processes based on the content of the specification and the accompanying drawings of the present disclosure for direct or indirect use in other relevant technical fields shall also be encompassed in the patent protection scope of the present disclosure.

What is claimed is:

1. A method for identifying a state of a user of a social network, the social network comprising an activated user, a non-activated user, and a silent user, a state of the silent user being unstable, the silent user finally becoming the activated user or the non-activated user, and the identification method comprising:
    acquiring a user-event similarity of the user regarding a new event;
    identifying whether the user is the silent user or the non-activated user according to the user-event similarity; and
    determining whether the silent user or the non-activated user on the social network is finally in an activated state or a non-activated state by:
        determining a state of an associated user of the silent user or the non-activated user in a previous iteration, the associated user referring to a user that has a follow relationship with the user;
        determining, according to the state of the associated user in the previous iteration, a probability that the silent user or the non-activated user changes to the activated state;
        determining a total quantity of associated users of the silent user that are currently in the activated state; and
        determining whether the silent user is finally in the activated state or the non-activated state according to the total quantity and a threshold of the silent user, the threshold being a real number existing for the silent user and ranging between zero and one, the threshold being related to a difficulty level at which the user is activated, determining whether the silent user is finally in the activated state or the non-activated state according to the total quantity and the threshold comprising comparing the total quantity with the threshold, the silent user being finally in the activated state when the total quantity is greater than or equal to the threshold, the silent user being finally in the non-activated state when the total quantity is less than the threshold, and behavior of the user in the social network being analyzed based on the determination whether the user is finally in the activated state or the non-activated state.

2. The method of claim 1, wherein identifying whether the user is the silent user or the non-activated user according to the user-event similarity comprises comparing the user-event similarity with a decision point value of the user, when the user-event similarity is greater than the decision point value, the user is the silent user, when the user-event similarity is less than or equal to the decision point value, the user is the non-activated user, the decision point value being a value existing for the user and used for deter lining a state of the user, and a lower decision point value indicating that the user is more likely to be the silent user.

3. The method of claim 1, wherein acquiring the user-event similarity comprises:
    acquiring an event-event similarity and a user-user similarity on the social network;
    obtaining a record of a similar event by the user according to the event-event similarity, the similar event referring to an event that has happened before and that is similar to the new event; and performing iteration according to the record and the user-user similarity to obtain the user-event similarity of the user regarding the new event.

4. The method of claim 1, wherein the activated user comprises a user that shares the new event or submits a comment regarding the new event.

5. The method of claim 1, wherein the non-activated user comprises a user that does not share the new event and does not submit a comment regarding the new event.

6. The method of claim 1, wherein the silent user comprises a user that has not made a decision as to whether to share the new event or submit a comment regarding the new event.

7. The method of claim 1, wherein the user-event similarity is based on an interest level of the user regarding a past event that is similar to the new event.

8. The method of claim 2, wherein the decision point value is randomly generated.

9. A computer for identifying a state of a user of a social network, the social network comprising an activated user, a non-activated user, and a silent user, a state of the silent user being unstable, the silent user finally becoming the activated user or the non-activated user, and the computer comprising:
a processor;
a memory configured to store states of users; and
a bus, the memory and the processor being coupled to the bus separately to perform data exchange and communication through the bus, and
the processor being configured to:
acquire a user-event similarity of the user regarding a new event and identify whether the user is the silent user or the non-activated user according to the user-event similarity;
determine whether the silent user or the non-activated user on the social network is finally in an activated state or a non-activated state;
determine a state of an associated user of the silent user or the non-activated user in a previous iteration, the associated user referring to a user that has a follow relationship with the user;
determine, according to the state of the associated user in the previous iteration, a probability that the silent user or the non-activated user changes to the activated state;
determine a total quantity of associated users of the silent user that are currently in the activated state;
determine whether the silent user is finally in the activated state or the non-activated state according to the total quantity and a threshold of the silent user, the threshold being a real number existing for the silent user and ranging between zero and one, and the threshold being related to a difficulty level at which the user is activated;
compare the total quantity with the threshold, the silent user being finally in the activated state when the total quantity is greater than or equal to the threshold, and the silent user being finally in the non-activated state when the total quantity is less than the threshold; and
analyze behavior of the user in the social network based on the determination whether the user is finally in the activated state or the non-activated state.

10. The computer of claim 9, wherein the processor is configured to compare the user-event similarity with a decision point value of the user, when the user-event similarity is greater than the decision point value, the user is the silent user, when the user-event similarity is less than or equal to the decision point value, the user is the non-activated user, the decision point value being a value existing for the user and used for determining a state of the user, and a lower decision point value indicating that the user is more likely to be the silent user.

11. The computer of claim 9, wherein the processor is further configured to:
acquire an event-event similarity and a user-user similarity on the social network;
obtain a record of a similar event by the user according to the event-event similarity, the similar event referring to an event that has happened before and that is similar to the new event; and
perform iteration according to the record and the user-user similarity to obtain the user-event similarity of the user regarding the new event.

12. The computer of claim 9, wherein the activated user comprises a user that shares the new event or submits a comment regarding the new event.

13. The computer of claim 9, wherein the non-activated user comprises a user that does not share the new event and does not submit a comment regarding the new event.

14. The computer of claim 9, wherein the silent user comprises a user that has not made a decision as to whether to share the new event or submit a comment regarding the new event.

15. The computer of claim 9, wherein the user-event similarity is based on an interest level of the user regarding a past event that is similar to the new event.

16. The computer of claim 10, wherein the decision point value is randomly generated.

* * * * *

UNITED STATES PATENT AND TRADEMARK OFFICE
CERTIFICATE OF CORRECTION

PATENT NO. : 10,116,759 B2
APPLICATION NO. : 14/948993
DATED : October 30, 2018
INVENTOR(S) : Wei Fan, Jianfeng Qian and Yadong Mu It is certified that error appears in the above-identified patent and that said Letters Patent is hereby corrected as shown below:

On the Title Page

Item [30], "201310513974" should read "201310513974.5"

In the Claims

Column 18, Line 57, Claim 2, "deter lining" should read "determining"

Signed and Sealed this
Twenty-second Day of January, 2019

Andrei Iancu
*Director of the United States Patent and Trademark Office*